US012464610B2

(12) United States Patent
Yin et al.

(10) Patent No.: US 12,464,610 B2
(45) Date of Patent: Nov. 4, 2025

(54) DISTRIBUTED RADIO FREQUENCY OR MICROWAVE THAWING DEVICE

(71) Applicant: DOTWIL INTELLIGENT TECHNOLOGY CO., LTD., Shanghai (CN)

(72) Inventors: Weimin Yin, Shanghai (CN); Chao Guo, Shanghai (CN); Xu Shi, Shanghai (CN)

(73) Assignee: DOTWIL INTELLIGENT TECHNOLOGY CO., LTD., Shanghai (CN)

( * ) Notice: Subject to any disclaimer, the term of this patent is extended or adjusted under 35 U.S.C. 154(b) by 906 days.

(21) Appl. No.: 17/639,185

(22) PCT Filed: Jun. 15, 2020

(86) PCT No.: PCT/CN2020/096070
§ 371 (c)(1),
(2) Date: Feb. 28, 2022

(87) PCT Pub. No.: WO2021/036418
PCT Pub. Date: Mar. 4, 2021

(65) Prior Publication Data
US 2022/0330395 A1 Oct. 13, 2022

(30) Foreign Application Priority Data
Aug. 27, 2019 (CN) ........................ 201910797181.8

(51) Int. Cl.
*H05B 6/68* (2006.01)
*H05B 6/78* (2006.01)

(52) U.S. Cl.
CPC ............ *H05B 6/688* (2013.01); *H05B 6/782* (2013.01)

(58) Field of Classification Search
CPC ........ H05B 6/688; H05B 6/782; H05B 6/707; H05B 6/72; H05B 6/80
(Continued)

(56) References Cited

U.S. PATENT DOCUMENTS 4,320,276 A 3/1982 Takeuchi et al.
2008/0105672 A1 5/2008 Yamamoto et al.
2018/0220497 A1 8/2018 Ibragimov

FOREIGN PATENT DOCUMENTS

CN 102160458 A 8/2011
CN 102933905 A 2/2013
(Continued)

OTHER PUBLICATIONS

Translation of CN108812854A, "Radio Frequency Unfreezing System", Nov. 16, 2018, by WIPO (Year: 2018).*
(Continued)

*Primary Examiner* — Quang T Van
(74) *Attorney, Agent, or Firm* — Bayramoglu Law Offices LLC

(57) ABSTRACT

A distributed radio frequency or microwave thawing device includes one or more thawing units. The thawing unit includes a power supply module, a radio frequency or microwave generation module, a measuring unit, a tuning module, a control unit, an antenna module and a thawing chamber. The antenna module is disposed in the thawing chamber and includes a first antenna group and a second antenna group, the first antenna group includes one or more first antennas, the second antenna group includes one or more second antennas, the first antenna and the second antenna are arranged in pairs, pairs of first antenna and second antenna are arranged in parallel and opposite to each other and form an antenna unit, a plurality of antenna units are arranged side by side. The number of each of the radio
(Continued)

frequency or microwave generation module and the measuring unit is one or more.

9 Claims, 3 Drawing Sheets

(58) Field of Classification Search
USPC ....... 219/703, 702, 704, 709, 710, 711, 712, 219/700, 748, 750, 761, 770, 771, 780
See application file for complete search history.

(56) References Cited

FOREIGN PATENT DOCUMENTS

| | | | | |
|---|---|---|---|---|
| CN | 102934518 | A | | 2/2013 |
| CN | 103813498 | A | | 5/2014 |
| CN | 104219810 | A | | 12/2014 |
| CN | 105881793 | A | | 8/2016 |
| CN | 205655646 | U | | 10/2016 |
| CN | 107373296 | A | | 11/2017 |
| CN | 108767439 | A | | 11/2018 |
| CN | 108812854 | A | | 11/2018 |
| CN | 108882427 | A | * | 11/2018 |
| CN | 109413788 | A | | 3/2019 |
| CN | 109452530 | A | | 3/2019 |
| CN | 208768875 | U | | 4/2019 |
| CN | 110100994 | A | | 8/2019 |
| CN | 110493909 | A | | 11/2019 |
| EP | 3324705 | A1 | | 5/2018 |
| JP | 2009032638 | A | | 2/2009 |
| JP | 2009259511 | A | | 11/2009 |
| JP | 2017182885 | A | | 10/2017 |
| WO | 2014191799 | A1 | | 12/2014 |

OTHER PUBLICATIONS

Translation of CN103813498A, “Microwave Heating Device”, May 21, 2014, by ProQuest (Year: 2014).*

* cited by examiner

DISTRIBUTED RADIO FREQUENCY OR MICROWAVE THAWING DEVICE

CROSS REFERENCE TO THE RELATED APPLICATIONS

This application is the national phase entry of International Application No. PCT/CN2020/096070, filed on Jun. 15, 2020, which is based upon and claims priority to Chinese Patent Application No. 201910797181.8, filed on Aug. 27, 2019, the entire contents of which are incorporated herein by reference.

TECHNICAL FIELD

The present invention relates to the technical field of thawing, in particular to a distributed radio frequency or microwave thawing device.

BACKGROUND

Radio frequency or microwave thawing is a new type of thawing method, which makes lattice, molecules and ions in articles to be thawed vibrate and rotate violently through the high-speed changing radio frequency or microwave oscillating electromagnetic field to heat up, so as to achieve the purpose of rapid thawing. Compared with other thawing methods, the radio frequency or microwave thawing is faster, heat evenly and has less impact on a quality of the articles to be thawed.

The Chinese patent document published as CN208768875U discloses a radio frequency thawing apparatus, including a casing, where an interior of the casing is divided into a radio frequency space and an accommodating space from top to bottom by a baffle; and an air inlet is disposed on a side wall of the accommodating space, and an air outlet is disposed on a top of the radio frequency space. It also includes a food raw material box, a radio frequency heating mechanism for heating and thawing frozen food in the food raw material box, and a hot air system arranged in the accommodating space and communicated with the interior of the food raw material box. The radio frequency heating mechanism includes a radio frequency generator disposed in the accommodation space, an upper plate and a lower plate relatively disposed in the radio frequency space from top to bottom. The radio frequency generator is respectively connected to the upper plate and the lower plate, and an alternating electric field is formed between the upper plate and the lower plate after being electrified; and the food raw material box is located between the upper plate and the lower plate. The radio frequency thawing apparatus provided by the solution only provides one pair of antennas in the radio frequency space, and when the apparatus is required to provide high power, the power loss will increase accordingly. Moreover, since only one pair of antennas are adopted, the power densities at different positions on the antenna board are different, and the power density far away from the power-up position is small, resulting in the problem of uneven power density.

SUMMARY

In view of the defects in the prior art, an object of the present invention is to provide a distributed radio frequency or microwave thawing device.

The distributed radio frequency or microwave thawing device according to the present invention includes one or more thawing units;

- the thawing unit includes a power supply module, a control unit, a radio frequency or microwave generation module, a measuring unit, an antenna means and a thawing chamber;
- the power supply module, the radio frequency or microwave generation module, the measuring unit and the antenna means are connected in sequence;
- the control unit is connected to the power supply module and the measuring unit, respectively;
- the antenna means is disposed in the thawing chamber, and the antenna means includes a first antenna group and a second antenna group, the first antenna group includes one or more first antennas, the second antenna group includes one or more second antennas, the first antennas and the second antennas are arranged in pairs, pairs of first antenna and second antenna are arranged in parallel and opposite to each other and form an antenna unit, a plurality of antenna units are arranged side by side, and the thawing chamber includes one or more rows of antenna units; a working bin is formed between the first antenna group and the second antenna group; and the number of each of the radio frequency or microwave generation module and the measuring unit is one or more; and the radio frequency or microwave generation module and the measuring unit are connected to the antenna units one to one.

Preferably, the first antenna group and the second antenna group include a metal plate antenna and/or a waveguide antenna, with a gap between adjacent antenna units; and

- when the first antenna group and the second antenna group are metal plate antennas, a distance between the first antenna group and the second antenna group can be adjusted according to a shape and a size of an article to be thawed.

Preferably, the working bin includes a first support plate and a second support plate, the first support plate is disposed adjacent to the first antenna group, the second support plate is disposed adjacent to the second antenna group, and a space for placing the article to be thawed is formed between the first support plate and the second support plate;

- the first support plate and the second support plate are insulating support plates;
- a distance between the first support plate and the second support plate can be adjusted according to the shape and size of an article to be thawed; and
- the thawing chamber is a metal chamber, and the thawing chamber is grounded.

Preferably, the radio frequency or microwave generation module includes a radio frequency or microwave generation source and a solid-state power amplifier.

Preferably, the distributed radio frequency or microwave thawing device also includes a conveying means, a feeding port, a discharging port and a main console;

- the conveying means includes a conveyor belt and a drive means, and the drive means is configured to drive the conveyor belt to move;
- windows are disposed on the working bin of the thawing unit, a plurality of thawing units are arranged side by side and connected to each other through the windows, and the windows are connected through a connecting channel to form a conveying channel for the article to be thawed, the conveyor belt is disposed in the conveying channel, and the antenna units are arranged side by side along a conveying direction of the conveying channel;

the feeding port and the discharging port are arranged at two ends of the conveying channel, respectively;

the feeding port and the discharging port are respectively a metal feeding port and a metal discharging port; the connecting channel is a metal connecting channel; and the main console is in signal connection with control units of a plurality of thawing units.

Preferably, the thawing unit further includes a tuning module, the tuning module including one or more passive devices; the radio frequency or microwave power generated by the radio frequency or microwave generation module enters the tuning module via the measuring unit for impedance matching and then reaches the first antenna group and the second antenna group respectively, forming an alternating electric field between the first antenna group and the second antenna group.

Preferably, the measuring unit can detect forward power and backward power of the radio frequency or microwave generation module; and the tuning module can adjust to an impedance matching state where a ratio of the backward power to the forward power is minimized.

Preferably, the control unit can calculate the ratio of the backward power to the forward power according to the forward power and the backward power fed back by the measuring unit, and determine a state of the tuning module.

Preferably, the tuning module has a manual mode and/or an automatic mode, and the tuning module in the manual mode adjusts the impedance matching state between an output end of the radio frequency or microwave generation module and an input end of the antenna unit through manual setting; and the tuning module in the automatic mode automatically controls the impedance matching state between the output end of the radio frequency or microwave generation module and the input end of the antenna unit through the control unit, and the control unit adjusts the tuning module according to the forward power and the backward power fed back by the measuring unit.

Preferably, balanced feeding is adopted to ensure that feeding points of the first antenna in the first antenna group have a voltage amplitude difference less than 50% and a phase difference within a range of 0-90°; feeding points of the second antenna in the second antenna group have a voltage amplitude difference less than 50% and a phase difference within a range of 0-90°; and feeding points of the first antenna and the second antenna of the antenna unit have a voltage amplitude difference less than 70% and a phase difference within a range of 80-280°.

Compared with the prior art, the present invention has the following beneficial effects:

1. the present invention can provide one or more antenna units in the thawing unit according to actual needs, when the thawing unit needs to use larger power, a plurality of antenna units are arranged, and each antenna unit is provided with radio frequency or microwave energy by a separate radio frequency or microwave generation module, thereby avoiding the energy loss problem caused by power combination and re-feeding to a single antenna unit, and improving the power density and uniformity in the working bin.

2. The distributed radio frequency or microwave thawing device provided by the present invention combines the thawing unit with the material conveying means, can thaw a plurality of articles to be thawed at the same time, can quickly complete the thawing work of a large number of articles, and is suitable for assembly line work; at the same time, the articles to be thawed pass through each thawing unit sequentially on the conveyor belt, and thus the thawing uniformity will be better.

3. The working state of each thawing unit in the present invention is controlled by a separate control unit, the main console is connected to the control unit of each thawing unit, so that a user can independently select the number and placement of the thawing units according to needs, and can control the working state of each thawing unit separately through the main console, and adjust the working state of the thawing unit according to the thawing power and time required by the articles to be thawed.

4. The distributed radio frequency or microwave thawing device provided by the present invention adopts a combination mode of distributed building blocks to construct the thawing device, which features flexible location and diversity in function selection, and that if a certain thawing unit fails, the device can still continue to run, and at the same time, the maintenance is simple and the cost is low.

BRIEF DESCRIPTION OF THE DRAWINGS

Other features, objects and advantages of the present invention will become more apparent from reading the detailed description of non-limiting embodiments with reference to the following drawings.

In the drawings.

Figure 1:
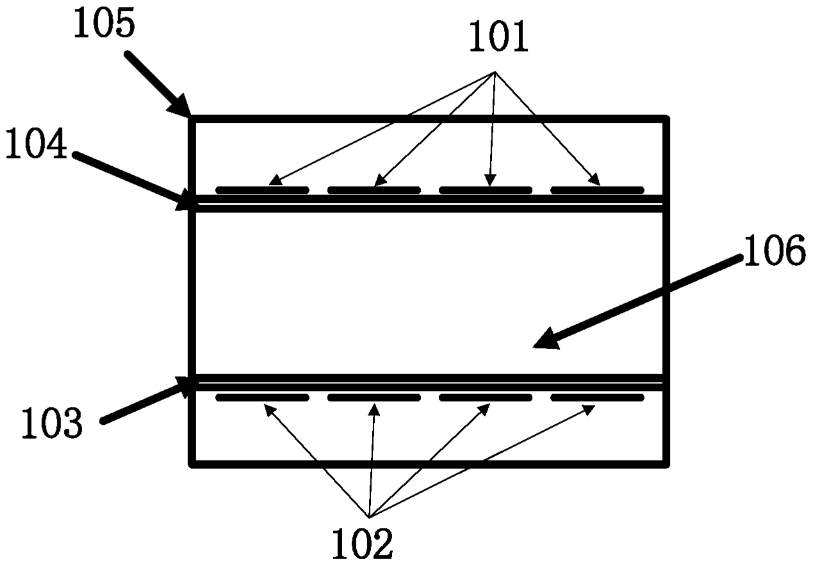
FIG. 1 is a structural schematic diagram of a thawing chamber of a thawing unit according to a first embodiment of the present invention, where a first antenna group and a second antenna group are metal plate antennas.

| |
|---|
| 101-first antenna group |
| 102-second antenna group |
| 103-second support plate |
| 104-first support plate |
| 105-thawing chamber |
| 106-working bin |
| 201-first waveguide antenna |
| 205-rolling shaft |
| 301-conveyor belt |
| 302-feeding port |
| 303-first thawing unit |
| 304-second thawing unit |
| 305-n-th thawing unit |
| 306-discharging port |
| 307-connecting channel |
| 308-article to be thawed |

DETAILED DESCRIPTION OF THE EMBODIMENTS

The present invention is described in detail below in conjunction with the specific embodiments. The following embodiments will assist those skilled in the art to further understand the present invention, but do not limit the present invention in any form. It should be noted that several changes and modifications may be made to those ordinarily skilled in the art without departing from the concept of the present invention. These are all within the protection scope of the present invention.

In the description of the present application, it should be understood that, orientation or positional relationships indicated by terms such as "up", "down", "front", "rear", "left", "right", "vertical", "horizontal", "top", "bottom", "in" and "out" are based on the orientation or positional relationships shown in the drawings, for ease of description of the present application and simplification of the description only, these terms do not indicate or imply that the means or element referred to must have a specific orientation or be constructed and operated in a specific orientation, and therefore cannot be construed as limitations to the present application.

Only one antenna unit is placed in a thawing chamber of a traditional thawing unit, and the high power is generated by combining the radio frequency or microwave power generated by a plurality of radio frequency or microwave generation modules, and then fed into the antenna unit, the loss of the combination is large, and a large amount of energy is lost in vain. The distributed radio frequency or microwave thawing device provided by the present invention can arrange a plurality of antenna units in the thawing chamber of each thawing unit, each antenna unit radiates corresponding power, which does not require combining the antenna units prior to generating the high power, and ensures the power density unchanged at the same time. Size and power of the traditional thawing unit are large (at least 2 KW), and the size and power design of a combined thawing device are inflexible and the cost is high, which can not better meet the needs of users. The distributed radio frequency or microwave thawing device provided by the present invention has the advantages of small size of each thawing unit, moderate power and various choices. If the traditional thawing device breaks down, it can't be used, resulting in the construction period delayed and high maintenance cost. The distributed radio frequency or microwave thawing device provided by the present invention adopts a combination mode of distributed building blocks to construct the thawing device, which features flexible location and diversity in function selection, and that if a certain thawing unit fails, the device can still continue to run, and at the same time, the maintenance is simple and the cost is low. In addition, the distributed radio frequency or microwave thawing device provided by the present invention is flexible in control, allows a flexibly selection of thawing units required for working, and makes it possible for flexibly setting the power of each thawing unit to ensure that the article to be thawed is in an optimal thawing state.

Figure 2:
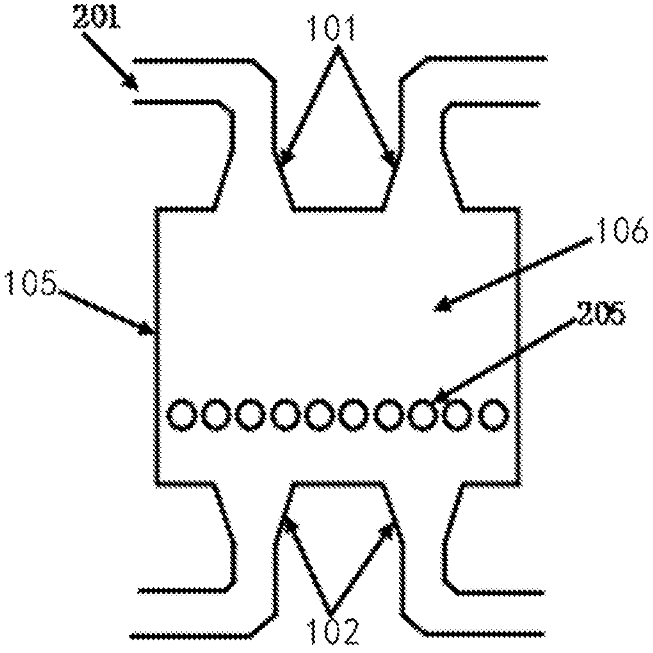
FIG. 2 is a structural schematic diagram of the thawing chamber of the thawing unit according to a second embodiment of the present invention, where the first antenna group and the second antenna group are waveguide antennas.
Figure 3:
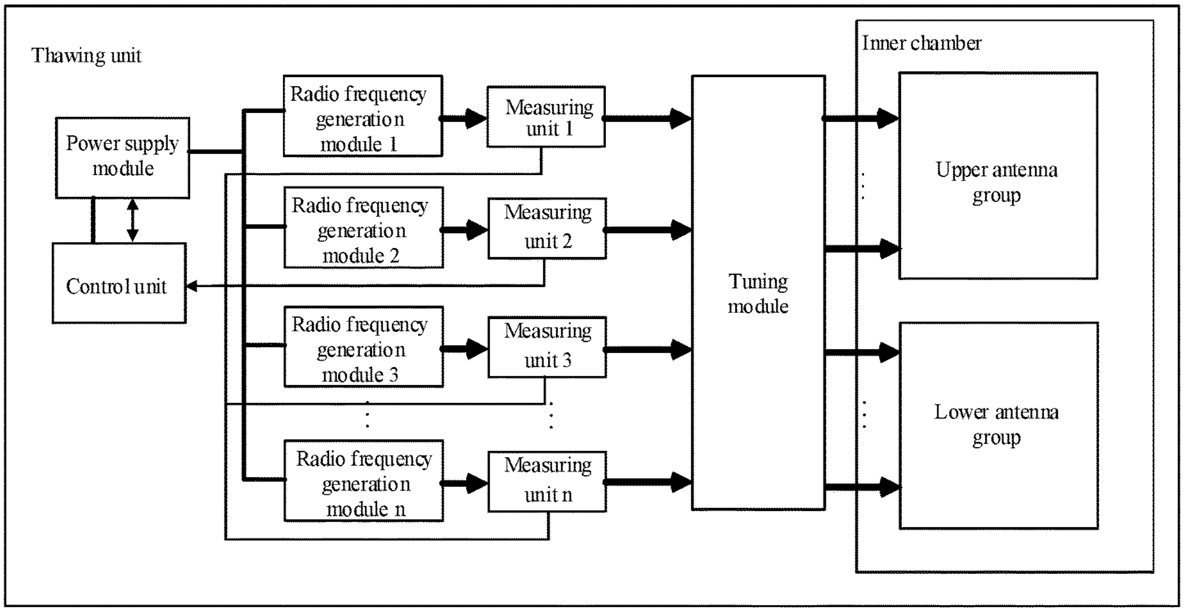
FIG. 3 is an internal structure of a system module of the thawing unit according to the present invention.
Figure 4:
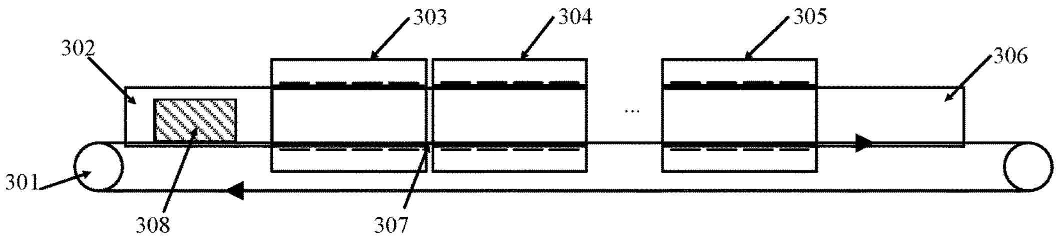
FIG. 4 is a schematic diagram of a distributed radio frequency or microwave thawing device according to a third embodiment of the present invention, where the first antenna group and the second antenna group are metal plate antennas.
Figure 5:
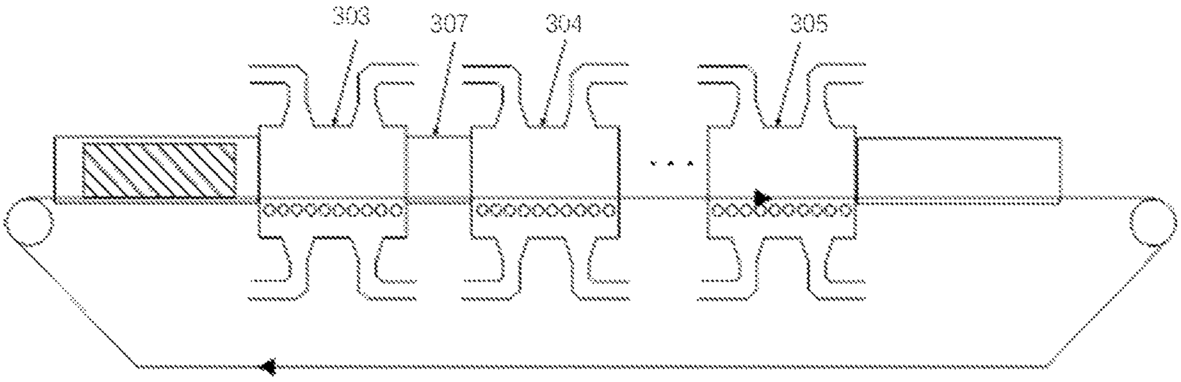
FIG. 5 is a schematic diagram of the distributed radio frequency or microwave thawing device according to a fourth embodiment of the present invention, where the first antenna group and the second antenna group are waveguide antennas.
Figure 6:
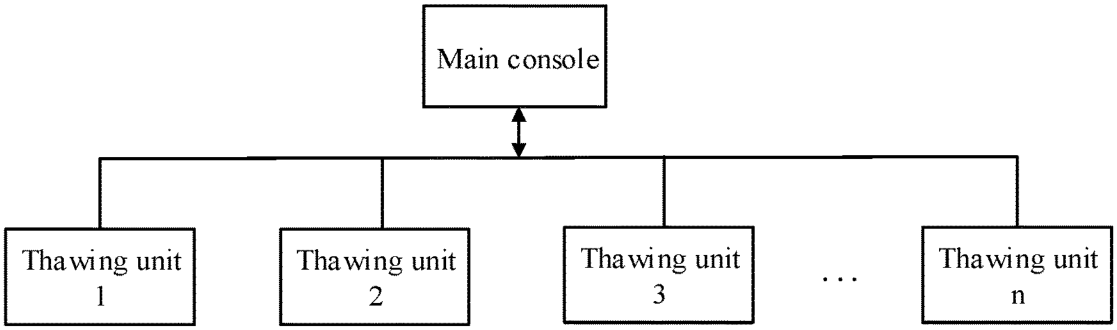
FIG. 6 is a schematic diagram of a control connection of the distributed radio frequency or microwave thawing device of the present invention.

As shown in FIGS. 1-6, the distributed radio frequency or microwave thawing device according to the present invention includes one or more thawing units. The thawing unit includes a power supply module, a control unit, a radio frequency or microwave generation module, a measuring unit, an antenna means and a thawing chamber 105. The power supply module, the radio frequency or microwave generation module, the measuring unit and the antenna means are connected in sequence. The control unit is connected to the power supply module and the measuring unit, respectively. The antenna means is disposed in the thawing chamber 105, and the antenna means includes a first antenna group 101 and a second antenna group 102, the first antenna group 101 includes one or more first antennas, the second antenna group 102 includes one or more second antennas, the first antennas and the second antennas are arranged in pairs, pairs of first antenna and second antenna are arranged in parallel and opposite to each other and form an antenna unit, a plurality of antenna units are arranged side by side, and the thawing chamber 105 includes one or more rows of antenna units. A working bin 106 is formed between the first antenna group 101 and the second antenna group 102. The number of each of the radio frequency or microwave generation module and the measuring unit is one or more. The radio frequency or microwave generation module and the measuring unit are connected to the antenna units one to one. The radio frequency or microwave power generated by the radio frequency or microwave generation module reaches the first antenna group 101 and the second antenna group 102, and an alternating electric field is formed between the first antenna group 101 and the second antenna group 102.

The first antenna group 101 and the second antenna group 102 include a metal plate antenna and/or a waveguide antenna with a gap between adjacent antenna units. When the first antenna group 101 and the second antenna group 102 are metal plate antennas, a distance between the first antenna group 101 and the second antenna group 102 can be adjusted according to a shape and a size of an article to be thawed 308. When both the first antenna group 101 and the second antenna group 102 are waveguide antennas, the first antenna group 101 includes one or more first waveguide antennas 201, and the second antenna group 102 includes one or more second waveguide antennas.

The working bin 106 includes a first support plate 104 and a second support plate 103, the first support plate 104 is disposed adjacent to the first antenna group 101, the second support plate 103 is disposed adjacent to the second antenna group 102, a space for placing an article to be thawed 308 is formed between the first support plate 104 and the second support plate 103. The first support plate 104 and the second support plate 103 are insulating support plates. A distance between the first support plate 104 and the second support plate 103 can be adjusted according to the shape and size of an article to be thawed 308. The thawing chamber 105 is a metal chamber, and the thawing chamber 105 is grounded, so as to prevent the radio frequency or microwave power from leaking to the outside of the chamber.

The radio frequency or microwave generation module includes a radio frequency or microwave generation source and a solid-state power amplifier. The solid-state power amplifier can amplify radio frequency or microwave signals with small power to produce radio frequency or microwave energy capable for quick thawing, and devices such as LDMOS or GaN can be used generally. The solid-state power amplifier is used to amplify the radio frequency or microwave signal generated by the radio frequency or microwave generation module to appropriate power, and transfer this part of radio frequency or microwave power to the measuring unit.

The thawing unit further includes a tuning module. The tuning module includes one or more passive devices. The radio frequency or microwave power generated by the radio frequency or microwave generation module enters the tuning module via the measuring unit for impedance matching and then reaches the first antenna group 101 and the second antenna group 102 respectively, forming an alternating electric field between the first antenna group 101 and the second antenna group 102. Preferably, the passive device is a capacitor with an adjustable capacitance value. In another embodiment, the passive device is a resistor with an adjustable resistance value. In yet another embodiment, the passive device is an inductor with an adjustable inductance value. The measuring unit can detect forward power and backward power of the radio frequency or microwave generation module. The tuning module can adjust to an impedance matching state where a ratio of the backward power to the forward power is minimized, to ensure maximum radio frequency or microwave energy entering the working bin during thawing.

The control unit can calculate the ratio of the backward power to the forward power according to the forward power and the backward power fed back by the measuring unit, and determine a state of the tuning module. If the ratio of the backward power to the forward power is smaller, it means that more radio frequency or microwave power reaches the antenna, and the thaw time is shorter. The tuning module has a manual mode and/or an automatic mode, and the tuning module in the manual mode adjusts the impedance matching state between an output end of the radio frequency or microwave generation module and an input end of the antenna unit through manual setting. The tuning module in the automatic mode automatically controls the impedance matching state between the output end of the radio frequency or microwave generation module and the input end of the antenna unit through the control unit, and the control unit adjusts the tuning module according to the forward power and the backward power fed back by the measuring unit. When the tuning module is in the automatic mode, the state of the tuning module is unique and definite when the thawing unit is in an empty state, for example, when the article to be thawed 308 is not placed in the working bin 106. Therefore, the control unit can determine whether the thawing unit is in the empty state according to the state of the tuning module. When the thawing unit is detected to be in the empty state, the control unit will automatically adjust the radio frequency or microwave power output by the radio frequency or microwave generation module, so that the output power automatically decreases to the minimum in the empty state.

Balanced feeding is adopted to ensure that feeding points of the first antenna in the first antenna group 101 have a voltage amplitude difference less than 50% and a phase difference within a range of 0-90°; feeding points of the second antenna in the second antenna group 102 have a voltage amplitude difference less than 50% and a phase difference within a range of 0-90°; and feeding points of the first antenna and the second antenna of the antenna unit have a voltage amplitude difference less than 70% and a phase difference within a range of 80-280°. Preferably, the feed points of the first antenna in the first antenna group 101 have the same voltage amplitudes and phases, the feed points of the second antenna in the second antenna group 102 have the same voltage amplitudes and phases, and the feed points of the first antenna and the second antenna of the antenna unit have the same voltage amplitudes and opposite phases, where the same may be exactly the same or approximately the same, as long as the two values are equivalent. The control unit, the measuring unit and the tuning module work together to realize the balanced feeding. A direction of the electric field is a direction in which the electric potential energy decreases most rapidly, and if the voltage amplitudes and phases on all the first antennas in the first antenna group 101 are approximately the same, the electric field between their edges is almost zero. Similarly, the electric field between edges of the second antennas in the second antenna group 102 is almost zero. When the voltage on the first antenna group 101 and the voltage on the second electrical level group 102 are of the same amplitude and opposite phase, more electric fields can be formed between the two antenna groups to facilitate rapid thawing of food.

The distributed radio frequency or microwave thawing device also includes a conveying means, a feeding port 302, a discharging port 306 and a main console. The conveying means includes a conveyor belt 301 and a drive means, and the drive means is configured to drive the conveyor belt 301 to move. Windows are disposed on the working bin 106 of the thawing unit, a plurality of thawing units are arranged side by side and connected to each other through the windows, and the windows are connected through a connecting channel 307 to form a conveying channel for the article to be thawed 308, the conveyor belt 301 is disposed in the conveying channel, and the antenna units are arranged side by side along a conveying direction of the conveying channel. The feeding port 302 and the discharging port 306 are arranged at two ends of the conveying channel, respectively. The feeding port 302 and the discharging port 306 are respectively a metal feeding port and a metal discharging port, and the connecting channel 307 is a metal connecting channel. The main console is in signal connection with control units of a plurality of thawing units. A user can independently select the number and placement of the thawing units according to needs, and can control the working state of each thawing unit separately through the main console, and adjust the working state of the thawing unit according to the thawing power and time required by the articles to be thawed.

For example, when the number of unfrozen units is n (n is a natural number), when thawing, the article to be thawed 308 is placed on the conveyor belt 301, and the drive means drives the conveyor belt 301 to move, the conveyor belt 301 transports article to be thawed 308 by starting from the feeding port 302, passing through the first thawing unit 303, the second thawing unit 304 . . . the last thawing unit (the n-th thawing unit 305), and reaching the discharging port 306 to complete thawing of the food. Preferably, one or more rolling shafts 205 are provided inside the thawing chamber 105, and the rolling shafts 205 are connected to the conveyor belt 301, through which the conveyor belt 301 moves, and the rolling shafts 205 can reduce the frictional resistance when the conveyor belt moves.

Preferred Embodiments

The distributed radio frequency or microwave thawing device provided by the present invention includes one or more thawing units. The thawing unit includes a power supply module, a radio frequency or microwave generation module, a measuring unit, a tuning module, a control unit, an antenna means and a thawing chamber 105. The power supply module, the radio frequency or microwave generation module, the measuring unit, the tuning module and the antenna means are connected in sequence. The control unit is connected to the power supply module, the measuring unit and the tuning module, respectively.

The power module is used for providing stable and reliable power output for each system module of the thawing unit. The radio frequency or microwave generation module is used for generating the radio frequency or microwave high power oscillating electromagnetic field, so that the lattice, molecules, ions and the like in the food violently oscillate and rotate to heat up, so as to achieve the purpose of thawing. The measuring unit is used for detecting the forward power and the backward power of the radio frequency or microwave generation module, thereby calculating the ratio of the backward power to the forward power. If the ratio is smaller, it means that more radio frequency or microwave power reaches the antenna and the thawing time is shorter. The tuning module is provided with one or more passive devices with adjustable inductance values or variable capacitance values, which can compensate for a ground impedance change caused by differences in type, size, location, shape and temperature of the food. The control unit takes charge of monitoring the working state of the whole system, collecting the forward power and backward power fed back by the measuring unit and adjusting the tuning module to ensure that the maximum radio frequency or microwave energy enters the thawing chamber 105 during thawing.

The thawing chamber 105 includes an antenna means and a working chamber 106. The antenna means includes a first antenna group 101 and a second antenna group 102, the first antenna group 101 includes one or more first antennas, the second antenna group 102 includes one or more second antennas, the first antennas and the second antennas are arranged in pairs, pairs of first antenna and second antenna are arranged in parallel and opposite to each other and form an antenna unit, a plurality of antenna units are arranged side by side, so that a relatively uniform electric field distribution can be easily realized between the first antenna and the second antenna which are arranged in parallel. The working bin 106 is formed between the first antenna group 101 and the second antenna group 102. The working bin 106 includes a first support plate 104 and a second support plate 103, the first support plate 104 is disposed adjacent to the first antenna group 101, the second support plate 103 is disposed adjacent to the second antenna group 102, a space for placing the article to be thawed 308 is formed between the first support plate 104 and the second support plate 103. The first support plate 104 and the second support plate 103 are insulating support plates.

The thawing chamber 105 is a metal chamber so as to constitute a shielding chamber, and further, the thawing chamber 105 is connected to the earth so as to prevent radio frequency or microwave power from leaking to outside of the chamber.

Only one antenna unit is placed in the thawing chamber of the traditional radio frequency or microwave thawing device, when larger radio frequency or microwave power is needed, the power of several radio frequency or microwave generation modules is combined outside the thawing chamber, and then fed into the antenna unit, which inevitably brings the problems of large power combination loss and high cost. Also, too large power after combining will easily lead to safety problems such as line ignition. Therefore, according to the power required, the present invention selectively arranges one or more antenna units in the thawing chamber 105, and the number of each of the radio frequency or microwave generation module and the measuring unit is one or more. The radio frequency or microwave generation module and the measuring unit are connected to the antenna units one to one. For example, when it is necessary to use multiple radio frequency or microwave generation modules to provide large radio frequency or microwave power, antenna units with the same number of the radio frequency or microwave generation modules are placed in the thawing chamber 105, each antenna unit receives the radio frequency or microwave energy provided by one radio frequency or microwave generation module, which does not require combining the antenna units prior to generating the high power, thus avoiding the loss caused by power combining, and at the same time, the power density in the thawing chamber 105 can be improved, so that the thawing speed is faster and the safety is higher.

The radio frequency or microwave power generated by the radio frequency or microwave generation module enters the tuning module via the measuring unit for impedance matching and then reaches the first antenna group 101 and the second antenna group 102 respectively, forming an alternating electric field between the first antenna group 101 and the second antenna group 102.

A solid-state power amplifier is arranged between the radio frequency or microwave generation module and the antenna means. The solid-state power amplifier can amplify radio frequency or microwave signals with small power to produce radio frequency or microwave energy capable for quick thawing, and devices such as LDMOS or GaN can be used generally. The solid-state power amplifier is used to amplify the radio frequency or microwave signal generated by the radio frequency or microwave generation module to appropriate power, and transfer this part of radio frequency or microwave power to the measuring unit.

The measuring unit can detect the forward power and the backward power of the radio frequency or microwave generation module, thereby calculating the ratio of the backward power to the forward power. If the ratio is smaller, it means that more radio frequency or microwave power reaches the antenna and the thawing time is shorter. The control unit adjusts the tuning module according to the forward power and the backward power fed back by the measuring unit. The tuning module includes one or more passive devices with adjustable inductance values or variable capacitance values. The tuning module can select an impedance matching state where a ratio of the backward power to the forward power is minimized, to ensure maximum radio frequency or microwave energy entering the working bin during thawing.

It is worth noting that when the tuning module is in the automatic mode, the state of the tuning module is unique and definite in an empty state (i.e., no food is placed in the working bin 106), and the thawing unit can detect whether the tuning module is in the automatic state to determine whether it is in the empty state. When the thawing unit detects that it is in an empty state, it will automatically adjust the power, that is, in the empty state, the output power can be automatically reduced to the minimum.

A direction of the electric field is a direction in which the electric potential energy decreases most rapidly, and if the voltage amplitudes and phases on all the first antennas in the first antenna group 101 are approximately the same, the electric field between their edges is almost zero. Similarly, the electric field between edges of the second antennas in the second antenna group 102 is almost zero. When the voltage on the first antenna group 101 and the voltage on the second electrical level group 102 are of the same amplitude and opposite phase, more electric fields can be formed between the two antenna groups to facilitate rapid thawing of food. Therefore, in a balance feeding manner, the feed points of the first antenna in the first antenna group 101 have the same voltage amplitudes and phases, the feed points of the second antenna in the second antenna group 102 have the same voltage amplitudes and phases, and the feed points of the first antenna and the second antenna of the antenna unit have the same voltage amplitudes and opposite phases (i.e., 180° out of phase). Each antenna is provided with a low-power radio frequency or microwave signal.

A plurality of thawing units are combined in a form of building blocks to construct the distributed radio frequency or microwave thawing device. The working bins 106 of the thawing units are opened to the left and right to facilitate the entry and exit of the article to be thawed 308 by passing the conveyor belt 301 through the working bin 106 of each thawing unit. The article to be thawed 308 is placed at the feeding port 302, which is an entry channel for food, and can play the role of attenuating electromagnetic waves to prevent overflow of the radio frequency or microwave energy. The conveyor carries food passing through each of the thawing units until reaching the discharge port 306 to complete the thawing of the food. The discharging port 306 also acts to attenuate electromagnetic waves to prevent the overflow of the radio frequency or microwave energy. Due to the small size and moderate power of each thawing unit, the assembled thawing device has flexible structure and low maintenance cost, and each thawing unit can be arranged separately to ensure that the food is in the optimal thawing state. At the same time, the article to be thawed 308 is placed on the conveyor belt and passes through each thawing unit sequentially, so that the thawing uniformity will be better.

When assembling, a metal feeding port is installed at one side of the first thawing unit 303, a metal discharging port is installed at one side of the n-th thawing unit 305, and a metal connecting channel 307 is arranged between the thawing units, they all serve to prevent the overflow of the radio frequency or microwave energy. Users can choose the number of thawing units independently and arrange them independently, and can also set the working state (e.g., power) of each thawing unit when different items are thawed. The control units of the thawing units are all connected through electric signals of the main console, and the user can independently control the thawing units through the main console.

The specific embodiments of the present invention have been described above. It is to be understood that the present invention is not limited to the above particular embodiments and that various changes or modifications can be made by those skilled in the art within the scope of the claims without affecting the substantial contents of the present invention. Embodiments and features of the present application can be arbitrarily combined with each other without conflict.

What is claimed is:

1. A distributed radio frequency or microwave thawing device, comprising one or more thawing units, wherein each of the one or more thawing units comprises a power supply module, a control unit, a radio frequency or microwave generation module, a measuring unit, an antenna means and a thawing chamber;

the power supply module, the radio frequency or microwave generation module, the measuring unit and the antenna means are connected in sequence;

the control unit is connected to the power supply module and the measuring unit, respectively;

the antenna means is disposed in the thawing chamber, and the antenna means comprises a first antenna group and a second antenna group, the first antenna group comprises one or more first antennas, the second antenna group comprises one or more second antennas, the one or more first antennas and the one or more second antennas are arranged in pairs, pairs of first antenna and second antenna are arranged in parallel and opposite to each other and form an antenna unit, a plurality of antenna units are arranged side by side, and the thawing chamber comprises one or more rows of antenna units;

a working bin is formed between the first antenna group and the second antenna group;

a number of each of the radio frequency or microwave generation module and the measuring unit is one or more; and the radio frequency or microwave generation module and the measuring unit are connected to the antenna units one to one, wherein balanced feeding is adopted to ensure that feeding points of the first antenna in the first antenna group have a voltage amplitude difference less than 50% and a phase difference within a range of 0-90°; feeding points of the second antenna in the second antenna group have a voltage amplitude difference less than 50% and a phase difference within a range of 0-90°; and feeding points of the first antenna and the second antenna of the antenna unit have a voltage amplitude difference less than 70% and a phase difference within a range of 80-280°.

2. The distributed radio frequency or microwave thawing device according to claim 1, wherein the first antenna group and the second antenna group comprise a metal plate antenna and/or a waveguide antenna, with a gap between adjacent antenna units; and when the first antenna group and the second antenna group are metal plate antennas, a distance between the first antenna group and the second antenna group is adjustable according to a shape and a size of an article to be thawed.

3. The distributed radio frequency or microwave thawing device according to claim 1, wherein the working bin comprises a first support plate and a second support plate, the first support plate is disposed adjacent to the first antenna group, the second support plate is disposed adjacent to the second antenna group, a space for placing an article to be thawed is formed between the first support plate and the second support plate;

the first support plate and the second support plate are insulating support plates;

a distance between the first support plate and the second support plate is adjustable according to a shape and a size of the article to be thawed; and the thawing chamber is a metal chamber, and the thawing chamber is grounded.

4. The distributed radio frequency or microwave thawing device according to claim 1, wherein the radio frequency or microwave generation module comprises a radio frequency or microwave generation source and a solid-state power amplifier.

5. The distributed radio frequency or microwave thawing device according to claim 1, further comprising a conveying means, a feeding port, a discharging port and a main console; wherein the conveying means comprises a conveyor belt and a drive means, and the drive means is configured to drive the conveyor belt to move;

windows are disposed on the working bin of the thawing unit, a plurality of thawing units are arranged side by side and connected to each other through the windows, and the windows are connected through a connecting channel to form a conveying channel for an article to be thawed, the conveyor belt is disposed in the conveying channel, and the antenna units are arranged side by side along a conveying direction of the conveying channel;

the feeding port and the discharging port are arranged at two ends of the conveying channel, respectively;

the feeding port and the discharging port are a metal feeding port and a metal discharging port, respectively;

the connecting channel is a metal connecting channel; and the main console is in signal connection with control units of a plurality of thawing units.

6. The distributed radio frequency or microwave thawing device according to claim 1, wherein the thawing unit further comprises a tuning module, the tuning module comprises one or more passive devices; radio frequency or microwave power generated by the radio frequency or microwave generation module enters the tuning module via the measuring unit for impedance matching and then reaches the first antenna group and the second antenna group respectively, wherein an alternating electric field is formed between the first antenna group and the second antenna group.

7. The distributed radio frequency or microwave thawing device according to claim 6, wherein the measuring unit is configured to detect forward power and backward power of the radio frequency or microwave generation module; and the tuning module is configured to adjust to an impedance matching state where a ratio of the backward power to the forward power is minimized.

8. The distributed radio frequency or microwave thawing device according to claim 7, wherein the control unit is configured to calculate the ratio of the backward power to the forward power according to the forward power and the backward power fed back by the measuring unit, and determine a state of the tuning module.

9. The distributed radio frequency or microwave thawing device according to claim 7, wherein the tuning module has a manual mode and/or an automatic mode, and the tuning module in the manual mode adjusts the impedance matching state between an output end of the radio frequency or microwave generation module and an input end of the antenna unit through manual setting; and the tuning module in the automatic mode automatically controls the impedance matching state between the output end of the radio frequency or microwave generation module and the input end of the antenna unit through the control unit, and the control unit adjusts the tuning module according to the forward power and the backward power fed back by the measuring unit.

* * * * *